(12) United States Patent
Makino et al.

(10) Patent No.: US 8,931,460 B2
(45) Date of Patent: Jan. 13, 2015

(54) FUEL VAPOR RECOVERY SYSTEM

(75) Inventors: Katsuhiko Makino, Aichi-ken (JP); Junya Kimoto, Obu (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 676 days.

(21) Appl. No.: 13/244,366

(22) Filed: Sep. 24, 2011

(65) Prior Publication Data

US 2012/0085325 A1 Apr. 12, 2012

(30) Foreign Application Priority Data

Oct. 12, 2010 (JP) .................................. 2010-229733

(51) Int. Cl.
*F02M 33/02* (2006.01)
*F02M 25/08* (2006.01)
*B01D 53/04* (2006.01)
*B01D 53/22* (2006.01)
*F02M 37/02* (2006.01)
*F02M 37/00* (2006.01)

(52) U.S. Cl.
CPC ............. *F02M 25/089* (2013.01); *B01D 53/04* (2013.01); *B01D 53/229* (2013.01); *F02M 37/025* (2013.01); *F02M 37/0082* (2013.01); *B01D 2253/102* (2013.01); *B01D 2259/40088* (2013.01); *B01D 2259/4516* (2013.01)
USPC ....................................................... 123/521

(58) Field of Classification Search
CPC ............. F02M 25/08; F02M 25/0836; F02M 25/0872; F02M 25/089; F02M 37/20
USPC ................... 123/514, 516, 518, 519, 520, 521
See application file for complete search history.

(56) References Cited

U.S. PATENT DOCUMENTS

| | | | | |
|---|---|---|---|---|
| 6,176,259 | B1 * | 1/2001 | Harde et al. ................... | 137/587 |
| 6,772,740 | B2 * | 8/2004 | Kojima et al. ................. | 123/519 |
| 6,786,207 | B2 * | 9/2004 | Kojima et al. ................. | 123/516 |
| 7,261,092 | B1 * | 8/2007 | Oku et al. ...................... | 123/516 |
| 8,327,830 | B2 * | 12/2012 | Makino et al. ................. | 123/518 |
| 8,474,439 | B2 * | 7/2013 | Makino et al. ................. | 123/516 |
| 2001/0052292 | A1 * | 12/2001 | Ito ................................... | 96/134 |
| 2004/0000352 | A1 * | 1/2004 | Kojima et al. .................. | 141/45 |
| 2010/0107877 | A1 * | 5/2010 | Suzuki et al. ....................... | 96/6 |
| 2010/0288021 | A1 * | 11/2010 | Makino et al. ................. | 73/40.7 |

(Continued)

FOREIGN PATENT DOCUMENTS

| | | |
|---|---|---|
| JP | 2002235608 | 8/2002 |
| JP | 2010116872 | 5/2010 |

*Primary Examiner* — Hieu T Vo
*Assistant Examiner* — Sherman Manley
(74) *Attorney, Agent, or Firm* — Ladas & Parry LLP

(57) ABSTRACT

A fuel vapor recovery system has a fuel tank, an adsorbent canister, a separator capable of separating fuel vapor from air, and a negative pressure supplier applying negative pressure to the adsorbent canister in order to remove the fuel vapor from the adsorbent canister. The separator has a housing and a separation membrane. The separation membrane divides an inner space of the housing into a receiving chamber and a permeation chamber and is configured to allow the fuel vapor to pass therethrough. The separator is connected with the fuel tank such that the fuel tank is fluidly connected with the receiving chamber. The negative pressure supplier is fluidly connected with the adsorbent canister via the permeation chamber. When the negative pressure supplier applies negative pressure to the adsorbent canister, purge gas flows from the adsorbent canister into the fuel tank via the permeation chamber.

7 Claims, 6 Drawing Sheets

(56) References Cited

U.S. PATENT DOCUMENTS

2010/0294251 A1* 11/2010 Makino et al. ............... 123/519
2011/0146491 A1* 6/2011 Suefuji et al. ............... 96/8
2011/0214646 A1* 9/2011 Makino ............... 123/518
2011/0247595 A1* 10/2011 Ogita et al. ............... 123/521

* cited by examiner

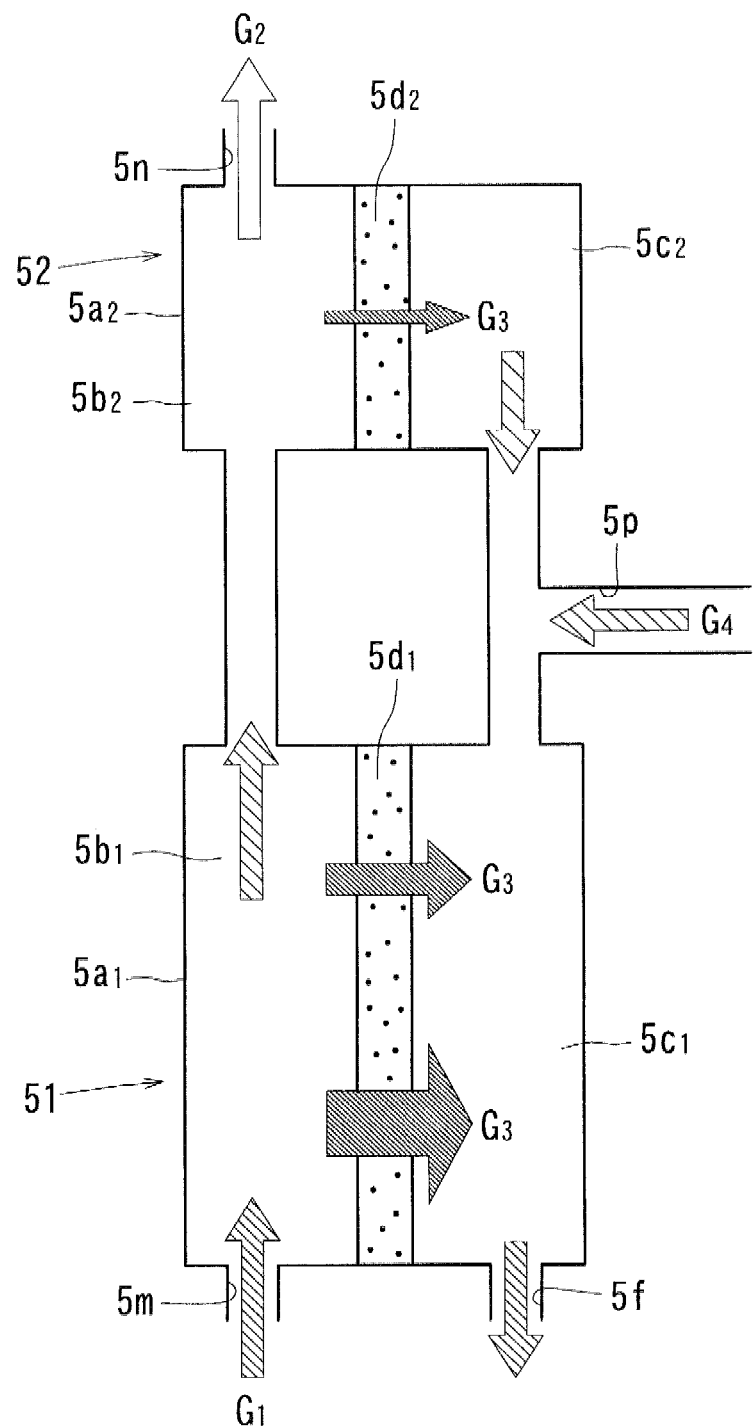
F I G. 5

FUEL VAPOR RECOVERY SYSTEM

CROSS-REFERENCES TO RELATED APPLICATIONS

This application claims priority to Japanese Patent Application Serial Number 2010-229733, the contents of which are incorporated herein by reference.

BACKGROUND OF THE INVENTION

1. Field of the Invention

The present invention relates to fuel vapor recovery systems for gas vehicle, particularly relates to fuel vapor recovery systems each having a separation module capable of separating fuel vapor from air.

2. Description of the Related Art

Japanese Laid-Open Patent Publication No. 2010-116872 discloses a conventional fuel vapor recovery system having an adsorbent canister that can trap fuel vapor, a negative pressure supplier that provides negative pressure to the adsorbent canister in order to remove the fuel vapor from the adsorbent canister, and a separation module that has a separation membrane capable of separating the fuel vapor from air. The fuel vapor recovery system has a vacuum pump as negative pressure supplier. When the vacuum pump operates, air is introduced into the adsorbent canister in order to remove the fuel vapor from the adsorbent canister and then mixture of the fuel vapor and air is introduced into the separation module and is separated into the fuel vapor and air. In detail, the vacuum pump is provided between the adsorbent canister and the separation module. Air remaining in the separation module, i.e., air that has not passed through the separation membrane, is introduced into the adsorbent canister in order to purge the adsorbent canister. Here, while purging the adsorbent canister, fuel vapor vaporized in the fuel tank is not introduced into the adsorbent canister or the like.

In such system, the separation membrane divides an inner space of the separation module into a receiving chamber fluidly communicated with an inlet for receiving fuel vapor containing gas and a permeation chamber fluidly communicated with an outlet for discharging separated fuel vapor. With regard to the separation module having the separation membrane, it is known that when difference between partial pressures of the fuel vapor in the receiving chamber and the permeation chamber across the separation membrane becomes larger, separation efficiency of the separation membrane (amount of fuel vapor separated per unit of time) becomes higher. Thus, in a condition where the fuel vapor presents in the receiving chamber, when concentration of fuel vapor in the permeation chamber becomes lower, the separation efficiency of the separation membrane becomes higher. In the separation module disclosed in Japanese Laid-Open Patent Publication No. 2010-116872, the vacuum pump applies positive pressure to the receiving chamber, however pressure in the permeation chamber is not controlled. Thus, concentration (partial pressure) of the fuel vapor in the permeation chamber is constantly high, so that it is difficult to efficiently separate the fuel vapor from air. Accordingly, there has been a need for improved fuel vapor recovery system.

SUMMARY OF THE INVENTION

In one aspect of the present teachings, a fuel vapor recovery system has a fuel tank, an adsorbent canister, a separator capable of separating fuel vapor from air, and a negative pressure supplier applying negative pressure to the adsorbent canister in order to remove the fuel vapor from the adsorbent canister. The adsorbent canister is connected with the fuel tank and is filled with an adsorbent capable of adsorbing the fuel vapor. The separator has a housing and a separation membrane. The separation membrane divides an inner space of the housing into a receiving chamber and a permeation chamber and is configured to allow the fuel vapor to pass therethrough in order to selectively transfer the fuel vapor from the receiving chamber to the permeation chamber. The separator is connected with the fuel tank such that the fuel tank is fluidly connected with the receiving chamber. The negative pressure supplier is fluidly connected with the adsorbent canister via the permeation chamber of the separator. When the negative pressure supplier applies negative pressure to the adsorbent canister, purge gas flows from the adsorbent canister into the fuel tank via the permeation chamber.

In accordance with this aspect, because concentration of the fuel vapor in the purge gas flowing into the permeation chamber is generally lower than that in the permeation chamber, the permeation chamber can be purged with the purge gas. In addition, the negative pressure supplier can apply negative pressure to the permeation chamber. Thus, it is able to decrease the concentration of the fuel vapor in the permeation chamber, so that the separation efficiency for the fuel vapor in the separator can be improved.

BRIEF DESCRIPTION OF THE DRAWINGS

In the accompanying drawings:

FIG. 5 is a schematic view showing gas flow in the separation module in the second embodiment.

DETAILED DESCRIPTION OF THE INVENTION

Each of the additional features and teachings disclosed above and below may be utilized separately or in conjunction with other features and teachings to provide improved fuel vapor recovery systems. Representative examples of the present invention, which examples utilized many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Representative embodiments of the fuel vapor recovery system of this disclosure will be described. Each of the fuel vapor recovery systems has a fuel tank, an adsorbent canister, a negative pressure supplier, and a separation module, and can additionally have various components. The fuel vapor recovery systems of this disclosure are suitable for use in automobiles utilizing highly-volatile fuel (for example, gasoline).

Figure 1:
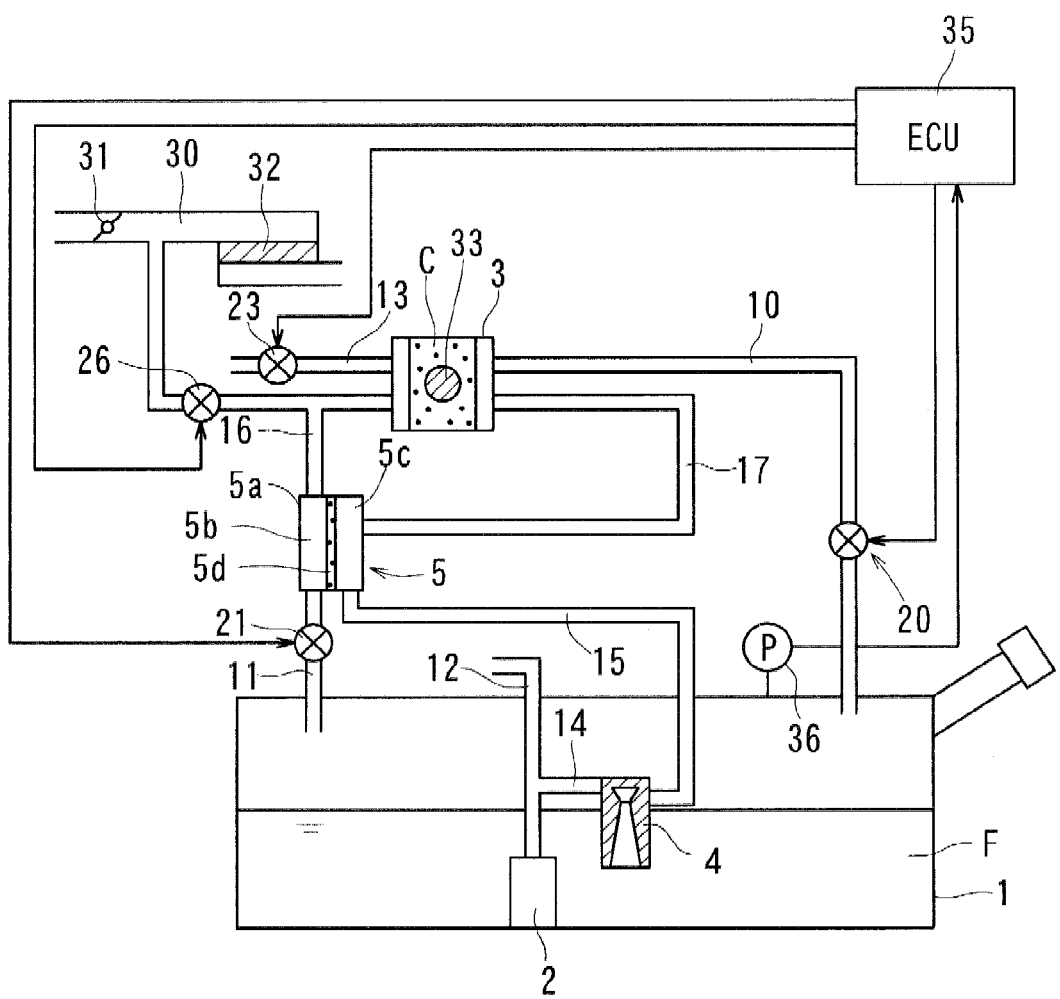
FIG. 1 is a schematic view of a fuel vapor recovery system in a first embodiment.

As shown in FIG. 1, a fuel vapor recovery system in a first embodiment has a fuel tank 1 reserving liquid fuel F therein, a fuel pump 2 pumping the liquid fuel F from the fuel tank 1 to an internal combustion engine (not shown), an adsorbent canister 3 capable of adsorbing and desorbing fuel vapor vaporized in the fuel tank 1, an aspirator 4 applying negative pressure to the adsorbent canister 3 in order to remove the fuel vapor from the adsorbent canister 3, a separation module 5 separating fuel vapor containing gas into air and the fuel vapor, a first introducing pipe 10 for introducing the fuel vapor from the fuel tank 1 into the adsorbent canister 3, and a second introducing pipe 11 for introducing the fuel vapor from the fuel tank 1 into the separation module 5. In this embodiment, the aspirator 4 and the separation module 5 correspond to a negative pressure supplier and a separator in this disclosure, respectively.

The fuel tank 1 is sealed. The fuel tank 1 has a pressure sensor 36 for measuring inner pressure of the fuel tank 1. The pressure sensor 36 is configured to measure the inner pressure of the fuel tank 1 and then send signals to an engine control unit (ECU) 35. The fuel pump 2 is disposed in the fuel tank 1 and pumps the liquid fuel F to the engine through a fuel supply pipe 12. The adsorbent canister 3 is filled with an adsorbent C. The adsorbent C is made of porous materials capable of allowing air to pass therethrough and adsorbing and desorbing the fuel vapor. In this embodiment, the adsorbent C is made of activated carbon. The adsorbent canister 3 is provided with a heater 33 for heating the adsorbent C filled in the adsorbent canister 3. Adsorption capacity of the adsorbent C becomes smaller with increase in the temperature of the adsorbent C, and the adsorption capacity becomes larger with decrease in the temperature of the adsorbent C. Thus, it is desirable to increase the temperature of the adsorbent C as high as possible for desorbing the fuel vapor from the adsorbent C. However, when the fuel vapor departs from the adsorbent C, the temperature of the adsorbent C decreases due to vaporization heat. So, the heater 33 heats the adsorbent C during desorption of the fuel vapor from the adsorbent C in order to improve desorption efficiency of the fuel vapor.

The separation module 5 has a sealed container 5a and a separation membrane 5d dividing an inner space of the sealed container 5a into a receiving chamber 5b and a permeation chamber 5c. The separation membrane 5d is made of a known separation membrane having high solubility coefficient and diffusion coefficient such that the separation membrane 5d selectively allows fuel components (i.e., the fuel vapor) to pass therethrough and prevents air components from passing there. In detail, the separation membrane 5d has a non-porous filmy layer (functional layer) capable of separating the fuel components from air and a porous support layer supporting the filmy layer. The filmy layer may be made of an insoluble silicone rubber that is internally cross-linked or the like. The porous support layer may be made from synthetic resin such as polyimide (PT), polyetherimide (PEI) or polyvinylidene fluoride (PVDF) or ceramic. The separation membrane 5d may be formed in hollow fiber, flat plate, honeycomb or spiral shape.

The fuel tank 1 and the adsorbent canister 3 are connected with each other via the first introducing pipe 10. The first introducing pipe 10 has a valve 20 for controlling flow through the first introducing pipe 10. The adsorbent canister 3 is connected with an air communicating pipe 13 having one end that is open to the atmosphere. The air communicating pipe 13 has a valve 23 for controlling flow through the air communicating pipe 13. The fuel tank 1 is fluidly connected to the receiving chamber 5b of the separation module 5 via the second introducing pipe 11. The second introducing pipe 11 has a valve 21 for controlling flow through the second introducing pipe 11.

The adsorbent canister 3 is fluidly connected with the receiving chamber 5b of the separation module 5 via a non-permeated gas pipe 16. The non-permeated gas pipe 16 is branched and is connected to an intake pipe 30 that is configured to introduce air to the engine while the engine is running. The intake pipe 30 is provided with a throttle valve 31 for controlling an amount of air flowing into the engine depending on an angle of an accelerator pedal (not shown) and an air filter 32. The non-permeated gas pipe 16 has a valve 26 between a branching point of the non-permeated gas pipe 16 and the intake pipe 30 for controlling flow through the non-permeated gas pipe 16 toward the intake pipe 30. The non-permeated gas pipe 16 is connected to the intake pipe 30 between the throttle valve 31 and the air filter 32, i.e., upstream of the throttle valve 31. The adsorbent canister 3 is fluidly connected to the permeation chamber 5c of the separation module 5 via a purge pipe 17.

Each of the valves 20, 21, 23 and 26 is composed of a solenoid valve that is controlled by the ECU 35. The ECU 35 has a central processing unit (CPU), a read-only memory (ROM), and a random access memory (RAM). The ROM stores control programs such that the ECU 35 can operate and control components of the fuel vapor recovery system based on the control programs.

Figure 2:
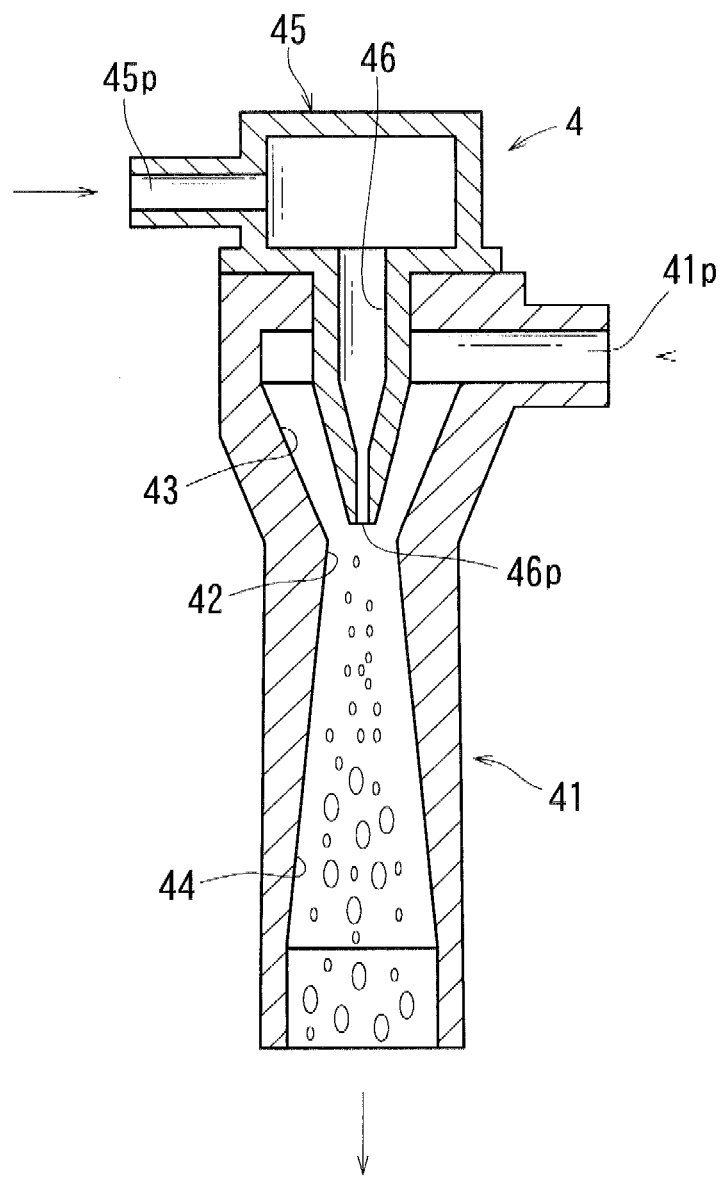
FIG. 2 is a cross-sectional view of an aspirator.

The fuel supply pipe 12 is branched and connected with a branch pipe 14 that has another end connected with the aspirator 4. The aspirator 4 is fluidly connected with the permeation chamber 5c of the separation module 5 via a recovery pipe 15. The aspirator 4 is a negative pressure supplier configured to generate negative pressure by flowing therethrough some of the liquid fuel F discharged from the fuel pump 2. In detail, as shown in FIG. 2, the aspirator 4 is composed of a venturi part 41 and a nozzle part 45. The venturi part 41 has a constricted portion 42, a tapered decompression chamber 43 that is positioned upstream of the constricted portion 42 in a fuel flow direction, a diffuser portion 44 that is positioned downstream of the constricted portion 42 and is configured to become wider along the fuel flow direction, and a suction port 41p. The decompression chamber 43, the constricted portion 42 and the diffuser portion 44 are disposed concentrically. The suction port 41p is fluidly communicated with the decompression chamber 43. The suction port 41p is connected with the recovery pipe 15. The nozzle part 45 is located upstream of the venturi part 41. The nozzle part 45 has a fuel intake port 45p for introducing the fuel F into the aspirator 4 and a nozzle body 46 for injecting fuel F. The fuel intake port 45p is connected with the branch pipe 14. The nozzle body 46 is concentrically inserted into the decompression chamber 43 such that an inject orifice 46p of the nozzle body 46 is positioned near and upstream of the constricted portion 42.

Some of the fuel F discharged from the fuel pump 2 is introduced into the aspirator 4 through the fuel supply pipe 12 and the branch pipe 14. Then, the fuel F is injected from the nozzle body 46 and flows through the constricted portion 42 and the diffuser portion 44 in the axial direction at high speeds. In this state, negative pressure is generated in the decompression chamber 43 because of venturi effect. Thus, it is able to provide suction power acting on the suction port 41p and the recovery pipe 15. Accordingly, gas (i.e., fuel vapor and air) in the recovery pipe 15 (and other components that are fluidly connected with the recovery pipe 15 such as the permeation chamber 5c and the adsorbent canister 3) is suctioned into the decompression chamber 43 through the suction port 41p and is discharged from the diffuser portion 44 together with the fuel F injected from the nozzle body 46.

Figure 3:
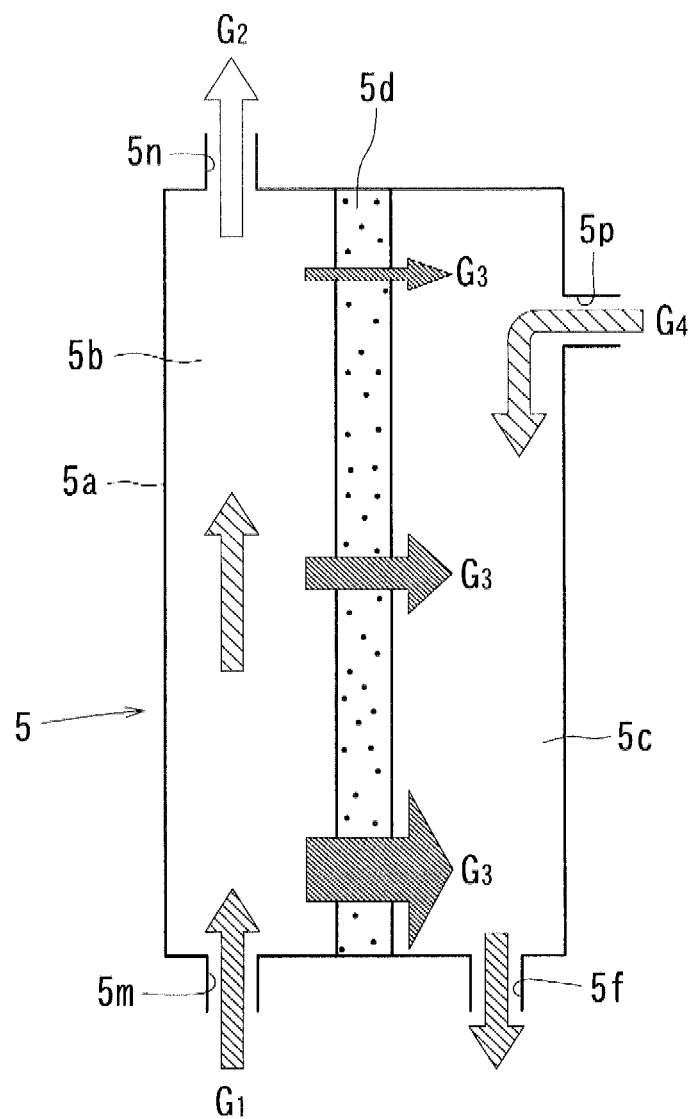
FIG. 3 is a schematic view showing gas flow in a separation module in the first embodiment.

As described in FIG. 3, the sealed container 5a of the separation module 5 has an introduction port 5m for introducing fuel vapor containing gas G1 into the receiving chamber 5b from the fuel tank 1, a non-permeated gas port 5n for discharging air contents that has not passed through the separation membrane 5d (which is referred to as non-permeated gas G2, hereafter), a recovery port 5f for returning fuel vapor that has passed through the separation membrane 5d (which is referred to as permeated gas G3, hereafter) to the fuel tank 1, and a purge port 5p for introducing purge gas G4 from the adsorbent canister 3 into the permeation chamber 5c. The introduction port 5m and the non-permeated gas port 5n are fluidly communicated with the receiving chamber 5b. The introduction port 5m is connected with the second introducing pipe 11. The non-permeated gas port 5n is connected with the non-permeated gas pipe 16. The introduction port 5m and the non-permeated gas port 5n are formed on opposite walls of the sealed container 5a such that the introduction port 5m and the non-permeated gas port 5 are concentrically located. Thus, the fuel vapor containing gas G1 introduced into the receiving chamber 5b flows from the introduction port 5m toward the non-permeated gas port 5n along the separation membrane 5d. This configuration increase the time of contact between the fuel vapor containing gas G1 and the separation membrane 5d, so that it is able to improve separation performance of the separation membrane 5d and decrease the amount of the fuel vapor remaining in the receiving chamber 5b.

On the other hand, the recovery port 5f and the purge port 5p are fluidly communicated with the permeation chamber 5c. The recovery port 5f is connected with the recovery pipe 15. The purge port 5p is connected with the purge pipe 17. The recovery port 5f is formed at an upstream end with respect to flow direction of the fuel vapor containing gas G1 (on the same side as the introduction port 5m). Thus, the permeated gas G3 flows along the separation membrane 5d in the permeation chamber 5c and then flows out via the recovery port 5f. Accordingly, gas flow direction in the permeation chamber 5c is opposite to the gas flow direction in the receiving chamber 5b. The purge port 5p is positioned between both ends (i.e., at a middle of the permeation chamber 5c) with respect to the flow direction of the permeated gas G3 in the permeation chamber 5c such that the purge gas G4 is supplied to a midstream of the permeated gas G3. Although the purge port 5p can be formed at an upstream end with respect to the flow direction of the permeated gas G3 (at a downstream end with respect to the flow direction of the fuel vapor containing gas G1), there is a possibility that purge efficiency by the purge gas G4 is lower than the case that the purge port 5p is positioned between both ends. Here, the sealed container 5a does not have a plurality of purge ports 5p such that the adsorbent canister 3 and the permeation chamber 5c of the separation module 5 is connected with each other via a single port (i.e., the purge port 5p).

The purge port 5p (where the permeation chamber 5c and the adsorbent canister 3 are fluidly communicated with each other) is located at the middle (not including both ends) of the permeation chamber 5c with respect to the flow direction of the permeated gas G3. Preferably, the purge port 5p is positioned as upstream as possible with respect to the flow direction of the permeated gas G3 in the permeation chamber 5c in order to make the purge gas G4 flow through a broader space in the permeation chamber 5c. Here, it is also desirable to position the purge port 5p at an area where a concentration of the fuel components (i.e., the fuel vapor) in the purge gas G4 is substantially equal to that in the permeation chamber 5c or downstream of the area with respect to the flow direction of the permeated gas G3. If the purge port 5p is formed upstream of the area, the concentration of the fuel vapor in a space upstream of the area is increased by the fuel vapor contained in the purge gas G4, so that separation efficiency of the separation membrane 5d decreases. It is most preferable to position the purge port 5p at the area where the concentration of the fuel vapor in the purge gas G4 is substantially equal to that in the permeation chamber 5c. Here, the concentration of the fuel vapor gradually decreases with progression of desorption of the fuel vapor from the adsorbent canister 3 while the fuel vapor recovery system is running. Therefore, it is preferable to use an initial concentration of the fuel vapor in the purge gas G4 that is measured at the start of introduction of the purge gas G4 into the permeation chamber 5c as the base. In general, the initial concentration of the fuel vapor in the purge gas G4 is about 10% by volume.

The area where the concentration of the fuel vapor in the purge gas G4 is substantially equal to that in the permeation chamber 5c varies depending on a concentration of the fuel vapor in the fuel vapor containing gas G1, size of the separation module 5, and separation performance of the separation membrane 5d, etc. Except extreme cold area and tropical area, on a condition that the vehicle is moving, the temperature of the fuel F is generally between 25° C. and 45° C. In such temperature range, the concentration of the fuel vapor in the fuel vapor containing gas G1 is generally between 30-50% by volume. When the fuel vapor containing gas G1 flows along the separation membrane 5d in the receiving chamber 5b, the concentration of the fuel vapor in the fuel vapor containing gas G1 gradually decreases along the flow direction of the fuel vapor containing gas G1. Because the amount of the fuel vapor passing through the separation membrane 5d increases with increase of the concentration of the fuel vapor in the receiving chamber 5b, the concentration of the fuel vapor in the permeation chamber 5c gradually increases along the flow direction of the permeated gas G3. For example, when the fuel vapor containing gas G1 that contains about 50% by volume of the fuel vapor flows into the receiving chamber 5b, with respect to the flow direction of the permeated gas G3 in the permeation chamber 5c, the concentration of the fuel vapor in a downstream area is more than 50% by volume, that in a midstream area is approximately between 15-20% by volume, and that in an upstream area is less than 5% by volume. Such tendency is determined based on the size of the separation module 5, the type of the separation membrane 5d and the like and thus can have been measured and recognized previously. Thus, the purge port 5p can be positioned appropriately based on predicted concentrations of the fuel vapor in the fuel vapor containing gas G1 and the purge gas G4, the size of the separation module 5, and the type of the separation membrane 5d, etc.

The concentration of the fuel vapor in the fuel vapor containing gas G1 increases with increase in temperature of the fuel F reserved in the fuel tank 1. Thus, with respect to the concentration of the fuel vapor in the fuel vapor containing gas G1, it is preferable to use the concentration of the fuel vapor at a lower limit of a generally predicted fuel temperature in the running vehicle (e.g., 25° C.) as the base. Of course, it is also able to use concentration of the fuel vapor at a relatively high temperature within the predicted fuel temperature range as the base. In a case that the concentration of the fuel vapor at the relatively high temperature is used as the base, when the fuel temperature is lower than a certain value, the purge port 5*p* is located upstream of the area where the concentration of the fuel vapor in the purge gas G4 is substantially equal to that in the permeation chamber 5*c*. On the other hand, in another case that the concentration of the fuel vapor at relatively low temperature is sued as the base, when the fuel temperature increases, the purge port 5*p* is located downstream of the area where the concentration of the fuel vapor in the purge gas G4 is substantially equal to that in the permeation chamber 5*c*.

A recovery mechanism of the fuel vapor by the fuel vapor recovery system will be described. During parking, the valve 23 is open, and the valves 20, 21 and 26 are closed. During refueling, the valve 20 is opened by the ECU 35. Here, the ECU 35 operates each components of the fuel vapor recovery system (such as each valve and the fuel pump 2) and controls their operation timings. When inner pressure of the fuel tank 1 increases during refueling, the fuel vapor containing gas G1 that contains air and fuel vapor vaporized in the fuel tank 1 flows into the adsorbent canister 3 through the first introducing pipe 10. Then, the fuel vapor is selectively trapped by the adsorbent C filled in the adsorbent canister 3. Remaining air passes through the adsorbent C and flows through the air communicating pipe 13 and then into the atmosphere. Due to this configuration, the inner pressure of the fuel tank 1 can be decreased in order to prevent breakage of the fuel tank 1 without air-pollution. After completion of refueling, the valve 20 is closed.

While the vehicle is moving (the engine is miming), the valve 23 is closed, and the valve 21 is open. In such condition, the valve 20 is always closed, and the valve 26 is basically closed. The heater 33 is provided with electric power in order to heat the adsorbent C in the adsorbent canister 3. When the valve 21 is opened, the fuel vapor containing gas G1 in the fuel tank 1 flows into the receiving chamber 5*b* of the separation module 5 through the second introducing pipe 12. In the receiving chamber 5*b*, as shown in FIG. 3, the fuel vapor containing gas G1 flows along the separation membrane 5*d* from the introduction port 5*m* toward the non-permeated gas port 5*n*. Meanwhile, the fuel vapor in the fuel vapor containing gas G1 selectively passes through the separation membrane 5*d*, so that the permeated gas G3 mainly containing the fuel vapor is produced in the permeation chamber 5*c*. On the other hand, the non-permeated gas G2 remaining in the receiving chamber 5*b* is introduced into the adsorbent canister 3 through the non-permeated gas pipe 16 in order to facilitate removal of the fuel vapor trapped in the adsorbent canister 3.

In parallel with this process, when the fuel pump 2 is driven, some of the fuel F discharged from the fuel pump 2 is introduced into the aspirator 4 through the fuel supply pipe 12 and the branch pipe 14. Then, the aspirator 4 generates negative pressure such that inner pressure of the recovery pipe 15 and that of the permeation chamber 5*c* of the separation module 5 decrease. Thus, the permeated gas G3 that has passed through the separation membrane 5*d* flows along the separation membrane 5*d* in the permeation chamber 5*c*. Then, the permeated gas G3 flows into the aspirator 4 via the recovery port 5*f* and the recovery pipe 15 and is then returned into the fuel tank 1 together with the fuel F.

The negative pressure generated by the aspirator 4 is applied to the purge pipe 17 and the adsorbent canister 3 via the permeation chamber 5*c* of the separation module 5. Thus, the fuel vapor trapped in the adsorbent canister 3 is removed (purged) from the adsorbent canister 3. The purge gas G4 containing the fuel vapor flows from the adsorbent canister 3 to the permeation chamber 5*c* of the separation module 5 via the purge pipe 17. Because the concentration of the fuel vapor in the purge gas G4 is lower than that in the permeation chamber 5*c*, the permeation chamber 5*c* is purged with the purge gas G4 as shown in FIG. 3 such that the concentration of the fuel vapor, i.e., partial pressure of the fuel vapor in the permeation chamber 5*c* decreases. In a result, it is able to improve separation performance of the separation membrane 5*d*. In the permeation chamber 5*c*, the concentration of the fuel vapor at the upstream area is lower than those at the midstream and downstream areas, however the purge gas G4 is supplied to the middle of the permeation chamber 5*c*, so that the concentration of the fuel vapor in the upstream area is not increased by the purge gas G4. The purge gas G4 is discharged from the recovery port 5*f* together with the permeated gas G3 and is eventually introduced into the fuel tank 1. Due to this configuration, while purging the adsorbent canister 3, the fuel vapor containing gas G1 is introduced into the separation module 5. Thus, the fuel vapor recovery system can simultaneously purge the adsorbent canister 3 and decrease the inner pressure of the fuel tank 1.

When the inner pressure of the fuel tank 1 that is detected by the pressure sensor 36 exceeds a predetermined value (e.g., 5 kPa), the ECU 35 opens the valve 26. Then, the non-permeated gas G2 flows into the intake pipe 30 through the non-permeated gas pipe 16, so that it is able to decrease the inner pressure of the fuel tank 1. And then, when the inner pressure of the fuel tank 1 decreases adequately (e.g., to atmospheric pressure), the valve 26 is closed. Accordingly, if the inner pressure of the fuel tank 1 severely increases while purging the adsorbent canister 3, the fuel vapor recovery system can appropriately decrease the inner pressure of the fuel tank 1 in order to prevent breakage of the fuel tank 1.

Figure 4:
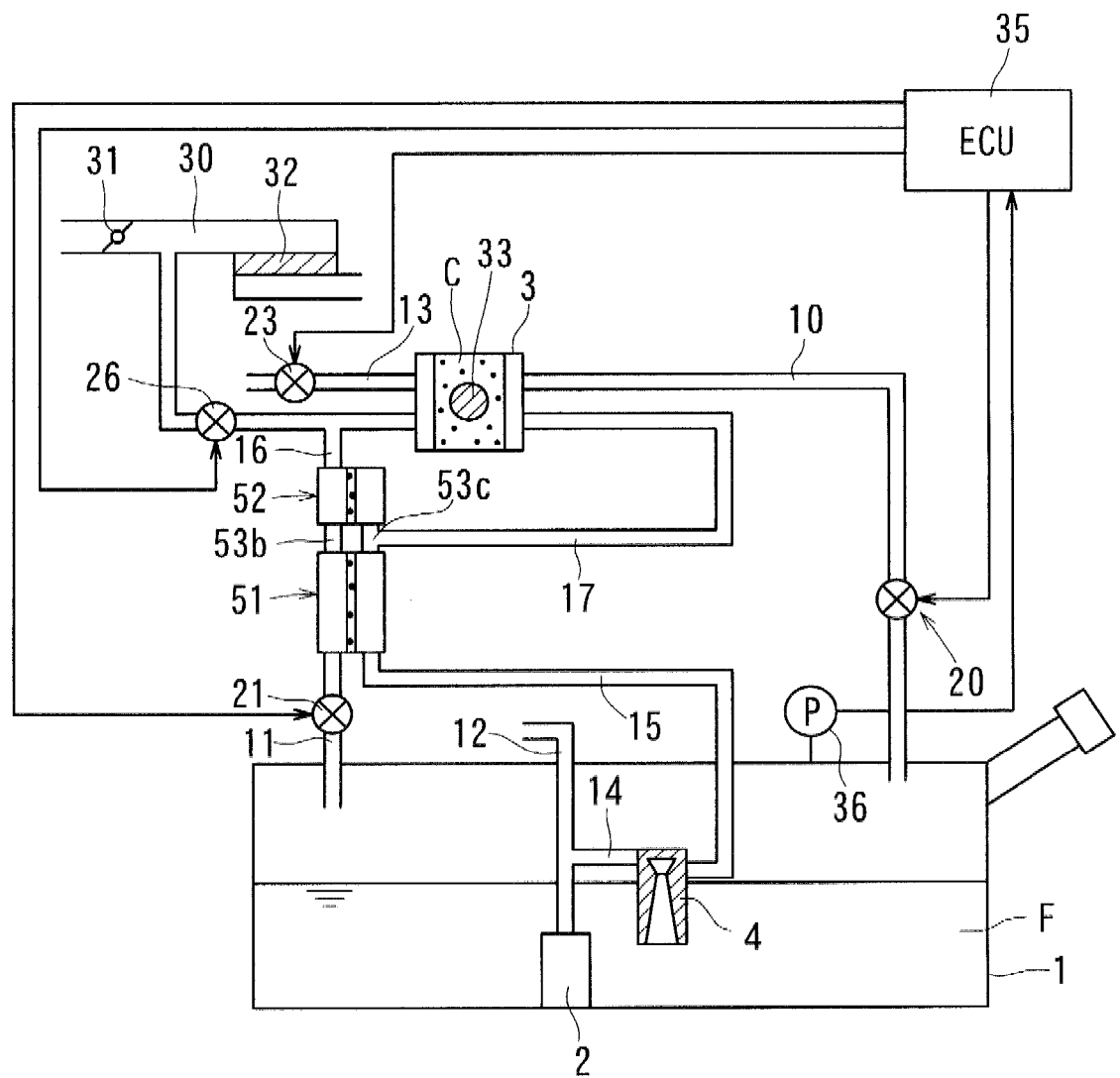
FIG. 4 is a schematic view of the fuel vapor recovery system in a second embodiment.

Next, a second embodiment will be described. Although the separation module 5 has a single unit in the first embodiment, the separation module may be divided into a plurality of units as shown in FIG. 4. In the second embodiment, the separation module has a first unit 51 and a second unit 52 as shown in FIGS. 4 and 5. With respect to the flow direction of the fuel vapor containing gas G1 in the receiving chamber 5*b*, the first unit 51 is located upstream of the second unit 52. The first unit 51 and the second unit 52 are arranged in tandem along the flow directions of the fuel vapor containing gas G1 and the permeated gas G3. The first unit 51 has a sealed container $5a_1$, a receiving chamber $5b_1$, a permeation chamber $5c_1$ and a separation membrane $5d_1$. Similarly, the second unit 52 has a sealed container $5a_2$, a receiving chamber $5b_2$, a permeation chamber $5c_2$ and a separation membrane $5d_2$. The receiving chamber $5b_1$ or the first unit 51 and the receiving chamber $5b_2$ of the second unit 52 are fluidly connected with each other via a connection pipe 53*b*. The permeation chamber $5c_1$ of the first unit 51 and the permeation chamber $5c_2$ of the second unit 52 are fluidly connected with each other via a connection pipe 53*c*.

The introduction port 5*m* for introducing the fuel vapor containing gas G1 into the first unit 51 from the fuel tank 1 is located at an upstream end of the receiving chamber $5b_1$ of the first unit 51 (with respect to the flow direction of the fuel vapor containing gas G1). The non-permeated gas port 5*n* for discharging the non-permeated gas G2 is located at a downstream end of the receiving chamber $5b_2$ of the second unit 52 (with respect to the flow direction of the fuel vapor containing gas G1). The recovery port 5*f* for discharging the permeated gas G3 that has passed either the separation membrane $5d_1$ or $5d_2$ is located at a downstream end of the permeation chamber $5c_1$ of the first unit 51 (with respect to the flow direction of the permeated gas G3). The purge port 5*p* for introducing the purge gas G4 from the adsorbent canister 3 into the separation module is located at a connection between the permeation chamber $5c_1$ of the first unit 51 and the permeation chamber $5c_2$ of the second unit 52, i.e., that is formed at the connection pipe 53c.

The first unit 51 has longer flow paths for the fuel vapor containing gas G1 and the permeated gas G3 than the second unit 52. Thus, the purge port 5p is located at or downstream of the area where the concentration of the fuel components in the purge gas G4 is substantially equal to that in the permeation chamber 5c and is placed at a most upstream position with respect to the flow direction of the permeated gas G3 in the permeation chamber 5c. Due to this configuration, most of the fuel vapor in the fuel vapor containing gas G1 passes through the separation membrane 5d, in the first unit 51, and a small amount of the fuel vapor passes through the separation membrane $5d_2$ in the second unit 52. Accordingly, the concentration of the fuel vapor in the permeation chamber $5c_1$ of the first unit 51 is higher than that in the purge gas G4, on the other hand, the concentration of the fuel vapor in the permeation chamber $5c_2$ of the second unit 52 is lower than that in the purge gas G4.

When the adsorbent canister 3 is purged, the purge gas G4 flows from the adsorbent canister 3 through the connection pipe 53c and into the separation module. Then, the permeation chamber $5c_1$ of the first unit 51 that is located downstream of the connection pipe 53c is purged with the purge gas G4. Accordingly, the concentration of the fuel vapor in the permeation chamber $5c_1$ decreases, so that it is able to improve the separation efficiency by the separation membrane $5d_1$. On the other hand, because the permeation chamber $5c_2$ of the second unit 52 is located upstream of the connection pipe 53c, the purge gas G4 does not flow into the permeation chamber $5c_2$ of the second unit 52. Thus, it is able to prevent increase in the concentration of the fuel vapor in the permeation chamber $5c_2$, and thus decrease in the separation efficiency of the separation membrane $5d_2$ in the second unit 52. Other configurations of this embodiment are same as those of the first embodiment, and thus will not be described repeatedly.

Some modification of the fuel vapor recovery system will be described. In each of the first and second embodiments, a three-way valve may be provided at a branching point of the non-permeated gas pipe 16 instead of the valve 26. In another variant, when the inner pressure of the fuel tank 1 exceeds the predetermined value during recovering the fuel vapor, the fuel vapor containing gas may be introduced into the adsorbent canister 3 in order to decrease the inner pressure of the fuel tank 1. In this case, a solenoid valve is provided on the branch pipe 14. When the inner pressure of the fuel tank 1 detected by the pressure sensor 36 exceeds the predetermined value, the ECU 35 closes the valve 21 and the solenoid valve on the branch pipe 14 and opens the valve 20. Thus, it is able to decrease the inner pressure of the fuel tank 1 during recovery of the fuel vapor. Then, when the inner pressure of the fuel tank 1 decreases sufficiently, the ECU 35 closes the valve 20 and opens the valve 21 and the solenoid valve on the branch pipe 14. Accordingly, in this case, the permeated gas pipe 16 does not have to be connected to the intake pipe 30, and the valve 26 is not necessary.

Although the non-permeated gas is introduced into the adsorbent canister 3 in the first and second embodiments, the non-permeated gas may be introduced into the intake pipe 30 or be released into the atmosphere. In a case that the non-permeated gas is introduced into the intake pipe 30, the valve 26 is opened at appropriate timing during recovering the fuel vapor. Alternately, the valve 26 may be not provided. In another case that the non-permeated gas is released into the atmosphere, the non-permeated gas pipe 16 may be open to the atmosphere. In a case that the non-permeated gas is not introduced into the adsorbent canister 3, the non-permeated gas pipe 16 is not connected to the adsorbent canister 3. Preferably, in this case, the valve 23 is opened during recovering the fuel vapor in order to introduce ambient air into the adsorbent canister 3 via the air communicating pipe 13.

Figure 6:
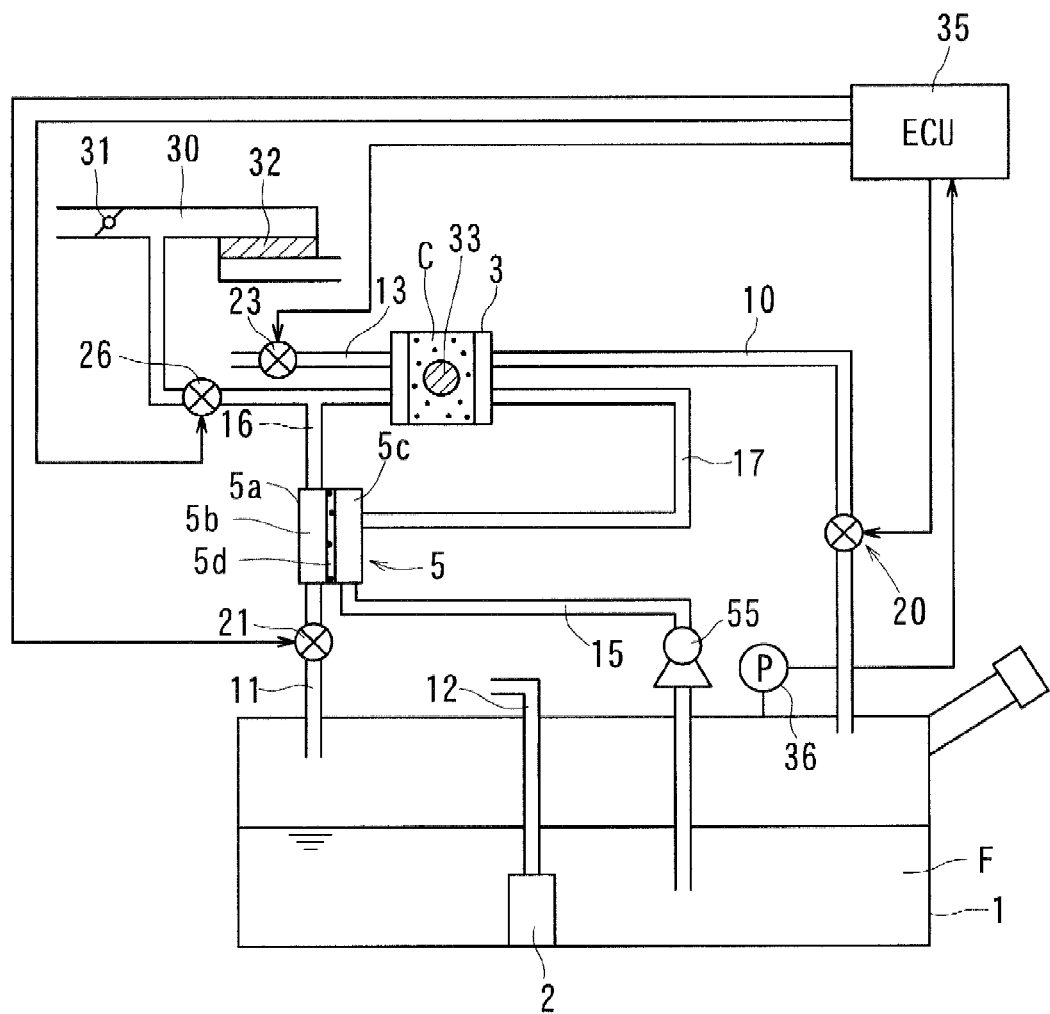
FIG. 6 is a schematic view of the fuel vapor recovery system having a vacuum pump.

As shown in FIG. 6, it is able to use a vacuum pump 55 as the negative pressure supplier instead of the aspirator 4. In this case, recovery process for the fuel vapor is substantially same as that in the first and second embodiment.

Although the separation module is separated into two units in the second embodiment, the separation module may be separated into at least three units. In such case, the separation module has a plurality of the connection pipes. The purge port 5p is preferably positioned at one of the connection pipes to meet both conditions that the purge port 5p is located at or downstream of the area where the concentration of the fuel vapor in the purge gas G4 is substantially equal to that in the permeation chamber and that the purge port 5p is located as upstream as possible with respect to the flow direction of the permeated gas G3 in the permeation chambers. Alternately, the purge port 5p may be formed on one of the units instead of the connection pipe.

The invention claimed is:

1. A fuel vapor recovery system comprising:
a fuel tank;
an adsorbent canister connected with the fuel tank and filled with an adsorbent capable of adsorbing fuel vapor;
a separator having a housing and a separation membrane that divides an inner space of the housing into a receiving chamber and a permeation chamber and being connected with the fuel tank such that the fuel tank is fluidly connected with the receiving chamber, the separation membrane allowing fuel vapor to pass therethrough;
a negative pressure supplier fluidly connected with the adsorbent canister via the permeation chamber of the separator and configured to apply negative pressure to the adsorbent canister in order to remove the fuel vapor from the adsorbent canister; and
wherein when the negative pressure supplier applies negative pressure to the adsorbent canister, purge gas flows from the adsorbent canister into the fuel tank via the permeation chamber of the separator in order to purge the permeation chamber.

2. The fuel vapor recovery system according to claim 1, wherein the separation membrane is located in the housing such that fuel vapor containing gas that is introduced into the receiving chamber from the fuel tank flows along the separation membrane in the receiving chamber and that fuel vapor that has passed through the separation membrane flows along the separation membrane in the permeation chamber.

3. The fuel vapor recovery system according to claim 2, wherein the adsorbent canister is connected to the separator such that the purge gas is supplied to a midstream of the fuel vapor in the permeation chamber.

4. The fuel vapor recovery system according to claim 3, wherein the separator has a plurality of units connected in series; and the adsorbent canister is connected to a connection between the units.

5. The fuel vapor recovery system according to claim 1, wherein the separator has a port such that the permeation chamber is fluidly connected with the adsorbent canister via the port; and the port is positioned such that concentration of the fuel vapor in the purge gas is substantially equal to or lower than that in the permeation chamber there.

6. The fuel vapor recovery system according to claim 5, wherein the receiving chamber is fluidly connected to the adsorbent canister such that fuel vapor containing gas flows from the fuel tank to the adsorbent canister via the receiving chamber.

7. The fuel vapor recovery system according to claim 1,
wherein the housing of the separator has an introduction port for introducing fuel vapor containing gas from the fuel tank, a non-permeated gas port for discharging air contents that have not passed through the separation membrane, a recovery port for returning fuel vapor that has passed through the separation membrane, and a purge port for introducing purge gas from the adsorbent canister into the permeation chamber;
wherein the introduction port and the non-permeated gas port are formed at the receiving chamber; and
wherein the recovery port and the purge port are formed at the permeation chamber.

\* \* \* \* \*